Jan. 11, 1966     E. M. WEINBERGER ETAL     3,228,244
FLUID FLOW METER
Filed Oct. 15, 1962     4 Sheets-Sheet 1
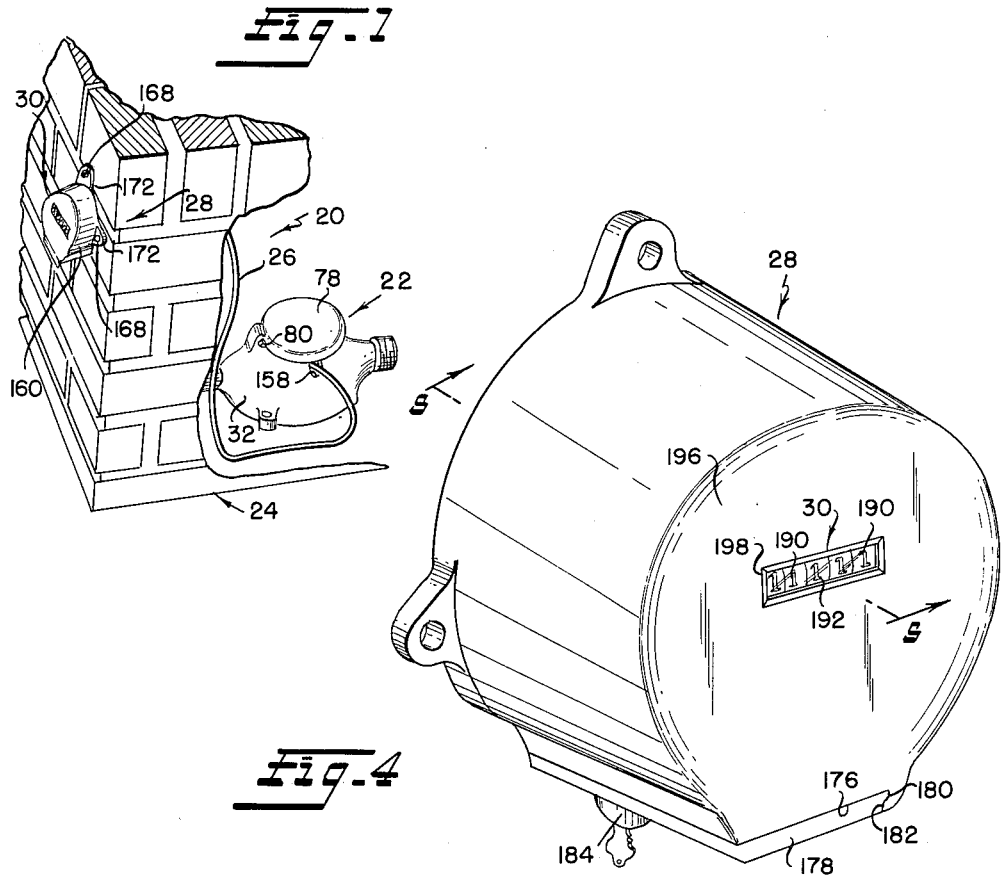
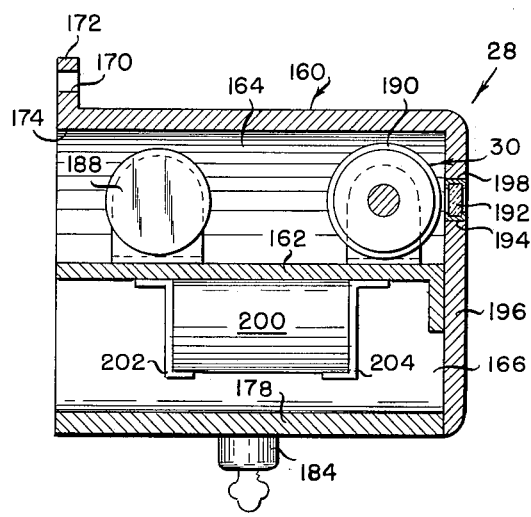
INVENTORS
Eugene M. Weinberger
Ralph E. Deffenbaugh
Bernard Last
BY Strauch, Nolan & Neale
ATTORNEYS

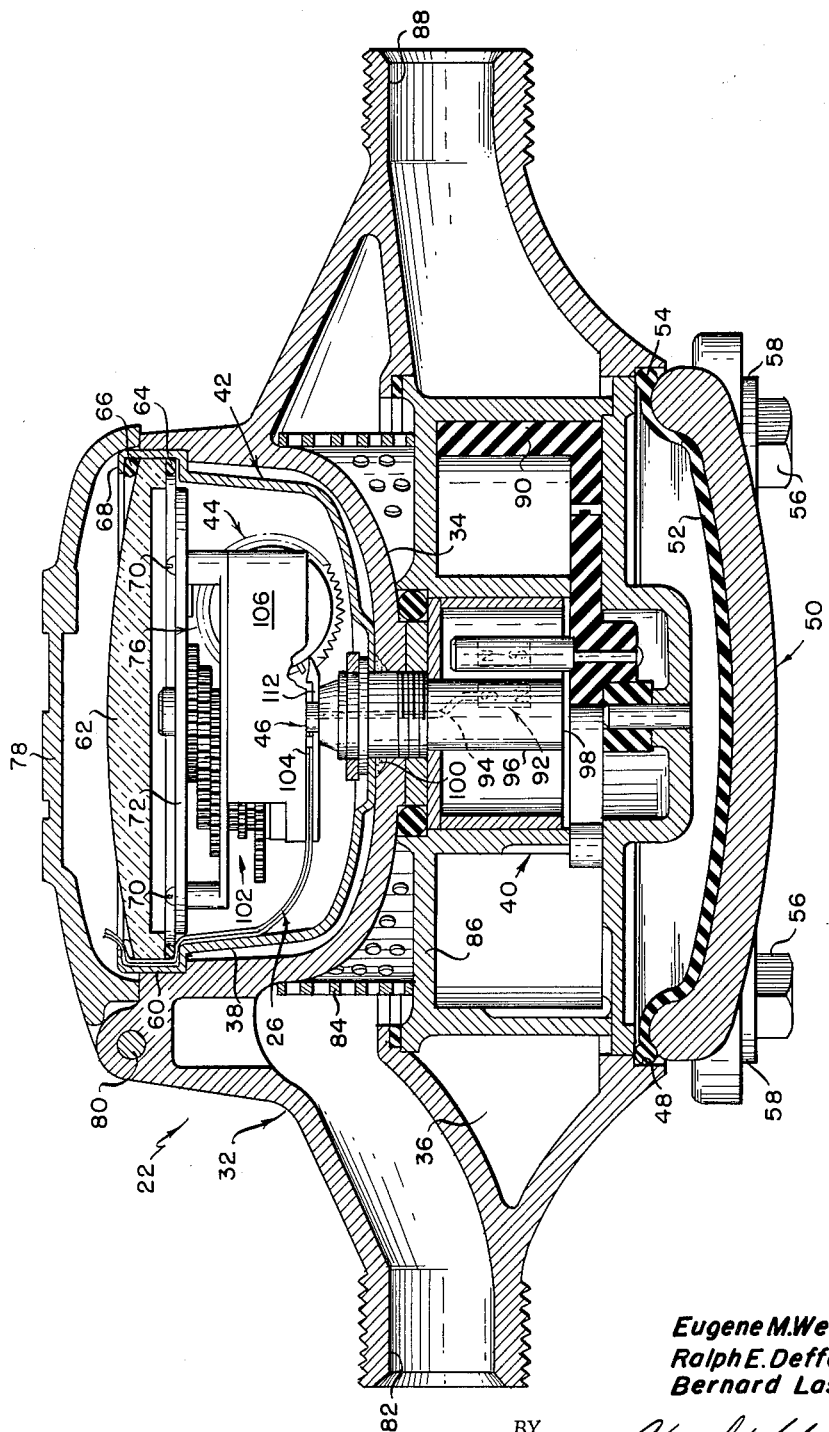

Jan. 11, 1966  E. M. WEINBERGER ETAL  3,228,244
FLUID FLOW METER
Filed Oct. 15, 1962  4 Sheets-Sheet 3

INVENTORS
Eugene M. Weinberger
Ralph E. Deffenbaugh
Bernard Last
BY Strauch, Nolan & Neale
ATTORNEYS Jan. 11, 1966  E. M. WEINBERGER ETAL  3,228,244
FLUID FLOW METER
Filed Oct. 15, 1962  4 Sheets-Sheet 4
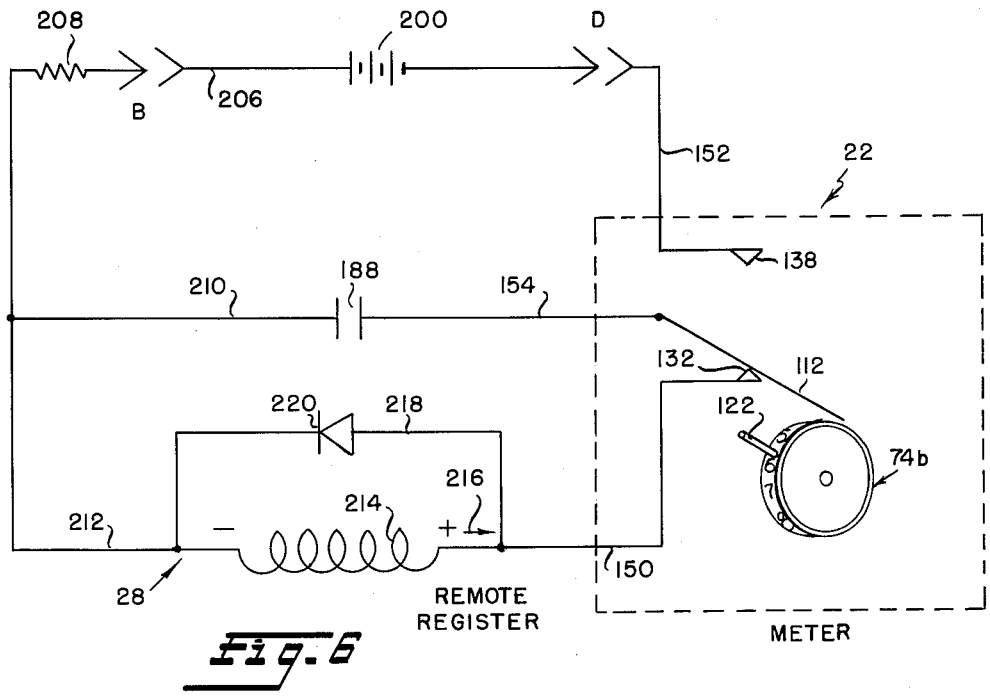
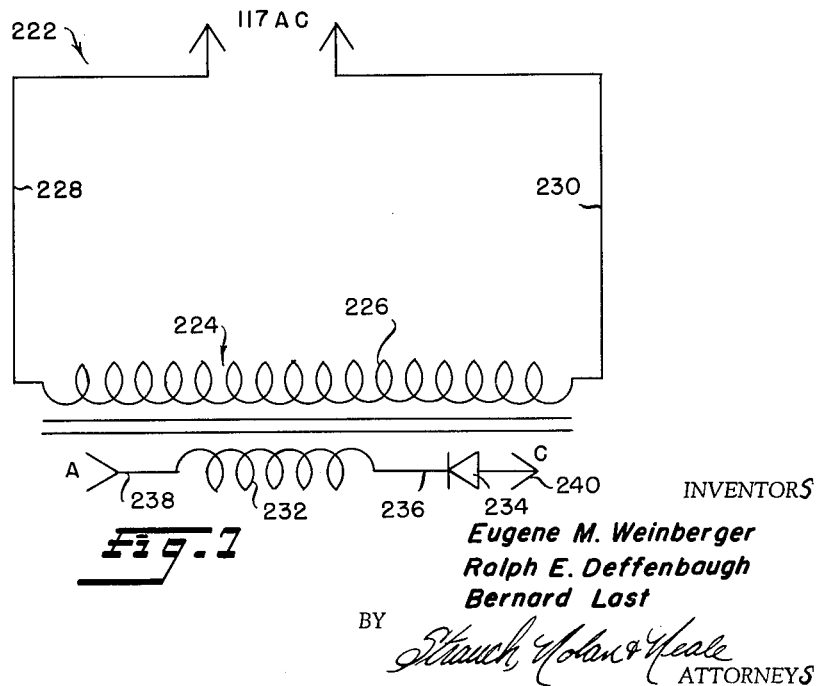
INVENTORS
Eugene M. Weinberger
Ralph E. Deffenbaugh
Bernard Last
BY
*Strauch, Nolan & Neale*
ATTORNEYS

United States Patent Office 3,228,244
Patented Jan. 11, 1966

3,228,244
FLUID FLOW METER
Eugene M. Weinberger, Ralph E. Deffenbaugh, and Bernard Last, Uniontown, Pa., assignors to Rockwell Manufacturing Company, Pittsburgh, Pa., a corporation of Pennsylvania
Filed Oct. 15, 1962, Ser. No. 230,512
9 Claims. (Cl. 73—272)

This invention relates to fluid flow meters and, more specifically, to a fluid flow meter equipped with a register readable at a location remote from the meter. The principles of this invention are particularly applicable to water consumption meters although the invention is by no means limited to this one particular application.

The conventional water consumption meter is equipped with a flow measuring mechanism and a register which indicates the cumulative volume of water passed through the meter. The meter is read periodically and the next preceding reading is subtracted from the current reading, the difference between the readings being the volume of water passed through the meter in the billing period between the current and precedent readings. The customer is then billed on the basis of this computed volume.

In the northern areas of this country, water consumption meters are frequently located in heated structures to prevent them from freezing during the winter months when sub-freezing temperatures normally prevail. If the structure is a home (and this is where the majority of water consumption meters are employed), the meter reader must obtain access to the home to read the meter. Frequently no one is at home when the meter reader calls and he is forced to estimate the meter reading or to return another time. Neither of these solutions is satisfactory. If the meter reader estimates the reading, the home owner may object should he discover that the consumption volume indicated on his bill does not correspond to the volume indicated by his meter. And, if the meter reader is forced to make a return trip, the time required to make the first trip is wasted and his employer is saddled with an additional expense which he must pass along to the consumer.

Three types of expedients for solving the access problem have been proposed, devices for making meter register visible from the exterior of the house, interrogation devices, and remote registers.

Among the devices heretofore proposed for making the meter register visible from the exterior of the house are periscopes, light conductors, and closed circuit television. These proposals have been abandoned because of the practical difficulties involved.

A highly successful interrogation device equipped water consumption meter is disclosed in copending application No. 150,689 filed November 7, 1961. Briefly, this meter consists of a conventional water consumption meter equipped with an analog type information storage device electrically connected to a socket accessible from the house exterior and a battery-operated, hand-carried interrogation device for extracting the information from the analog storage device, converting it to digital form, and recording it. This type of apparatus is operationally entirely satisfactory, but is too expensive to be utilized in all installations in which a remotely readable meter may be employed to advantage.

The remote register equipped meters heretofore proposed have been unsatisfactory, mainly because the power sources required for their operation were impractical. Permanently installed power sources located externally of the remote register including taps from the house's electrical circuits or from external power lines, solar batteries, and power turbines in the water line and the meter itself have all been tried and found lacking because of maintenance problems, because of their high cost, and because, being located without the register housing, they were exposed to tampering by unauthorized persons.

It has also been suggested that a flow operated generator be employed to activate the remote register of a flow meter equipped with such a device. Typical of the patents disclosing this type of device are United States Patents Nos. 2,315,805 issued April 6, 1943, to F. V. Mayo et al. for "Fluid Meter" and 3,039,311 issued June 19, 1962, to R. S. Bassett for "Water Meter." In general, these devices have been unsatisfactory, in main part because of the unreliability and/or expense of the generator and its associated circuitry.

Battery operated remote registers for flow meters have also been proposed. Typical of these devices are those shown in United States Patents Nos. 697,492 issued April 15, 1902, to W. H. Kelly for "Electromagnetic Water Meter" and 2,671,211 issued March 2, 1954, to K. H. Black et al. for "Remote Meter Reading Attachment for Inaccessible Meters." The meters disclosed in these patents, as is typical of this type of meter, have two serious drawbacks. In relation to the first of these, it is unfortunately common for consumers to cheat utilities by setting back the registers of or otherwise tampering with meters. To overcome this problem sealed registers such as those disclosed in United States Patent No. 2,857,763 issued October 28, 1958, to R. Z. Hague et al. for "Fluid Meters" have been developed. The need for such a register is still present when a battery operated remote register is employed to provide a check on the remote register if tampering is suspected. Fluid flow meters equipped with battery operated remote registers have not heretofore provided a sealed register.

The second of the drawbacks referred to above can best be identified by a brief description of the operation of the prior art flow meters incorporating battery operated remote registers. In these meters, in general, an output member rotated by flow through the meter carries an actuator which, as the member revolves, periodically closes a fixedly mounted switching device. Closing of the switching device electrically connects the battery to the actuating solenoid or similar electrically activated operator of an electromechanical counter, advancing the counter wheels.

Meters such as water consumption meters will often experience extended periods of idleness as, for example, when a home owner consumer is on vacation. During such periods the meter output member, remaining stationary, may maintain the switching device closed, draining the battery through the remote register actuating solenoid or other operator. Because of this possibility, the utility must check the batteries in their meters at intervals substantially more frequent than is economically feasible to insure that the remote register does not become inoperative.

This invention provides a remotely readable water consumption meter which is simpler, less expensive, and devoid of the objectionable features of the prior art meters. In general, it consists of two simple, mass producible units, a flow measuring (or flow meter) unit and a remote register (or flow registering) unit.

The flow meter unit is a conventional sealed register water consumption meter equipped with a switch moved through a register operating cycle from a normally closed contact to a normally open contact and back to the normally closed contact at a frequency proportional to the volume of water flowing through the flow meter unit.

The remote register unit includes a housing having a register compartment and a power supply compartment. Sealed in the register compartment are an electromechanical register and a strikingly simple electrical circuit including a register operating capacitor. The power supply compartment houses a battery or, alternatively, an alternating current power supply including an appropriate stepdown transformer and half wave rectifier and may be unlocked to permit replacement of the register operating battery or to service the alternating current power supply if the latter is employed.

When the meter unit incorporated switch is moved from its normally closed contact to its normally open contact, the battery or alternating current power supply is connected to and charges the capacitor. When the switch returns to the normally closed contact, the capacitor discharges through and steps the remote register.

The present invention has marked advantages over the devices heretofore proposed for eliminating the need for gaining access to a meter in order to read it. Unlike the devices proposed for making the meter register visible from the exterior of the house, it is entirely practicable. It is of acceptable accuracy and is substantially less expensive than the interrogation type meters. The simple counter operating circuit permits the use of a small inexpensive replaceable battery or a simple and likewise inexpensive alternating current power supply located in the remote register housing to actuate the register, eliminating the problems heretofore encountered in providing a suitable remote register operating power source.

In contrast to the prior art battery operated remote registers, a sealed register is provided for checking the remote register and thereby providing a deterrent to tampering with the latter. The problem of battery drain is eliminated since, when the register operating capacitor is fully charged, no further energy will be drained from the battery even through the capacitor charging circuit remains established for an extended period thereafter.

Although the present invention has been discussed above in conjunction with water consumption meters, it should be apparent from this discussion that it may be advantageously employed with any fluid flow meter which it is desired be readable from a remote location. This may be because it is desired to shield the meter from the elements or because it is located in an inaccessible location or because, for some other reason, it is inconvenient to read the meter at the meter location.

The objects of this invention include:

(1) The provision of an improved remotely readable fluid flow meter;

(2) The provision of a remotely readable fluid flow meter which is simpler and substantially less expensive than any workable meters of this type heretofore developed;

(3) The provision of a remotely readable fluid flow meter including a register located remote from the meter and a novel register operating circuit permitting a battery to be used as a power supply;

(4) In conjunction with the preceding object, the provision of a novel arrangement for preventing the battery from draining through the counter operating circuit even though said circuit remains established for a period exceeding that required to draw a register actuating charge of current from the battery;

(5) In conjunction with the third object, the provision of a register operating circuit designed to operate, alternatively, on stepped down house current;

(6) The provision of a remotely readable register device which may be added to existing sealed register fluid flow meters without significant modification of the existing meters;

(7) The provision of a remotely readable fluid flow meter having a remote register and a sealed, tamper-proof register for checking the remote register;

(8) In conjunction with the preceding object, the provision of a fluid flow meter sub-assembly having a totalizing register and a switching device for actuating a remote register hermetically sealed in a casing which must be destroyed to gain access to its contents and which thereby prevents moisture and dirt from penetrating to the interior of the casing and, in addition, prevents unauthorized persons from tampering with the mechanism sealed therein; and (9) The provision of a remote register unit for a remotely readable flow meter having a sealed compartment housing an electromechanical register and register operating electrical circuit components and a lockable compartment housing a power supply for operating the register.

Other objects and further novel features of the present invention will become more fully apparent from the appended claims and as the ensuing detailed description and discussion proceeds in conjunction with the accompanying drawing, in which:

FIGURE 1 is a perspective view illustrating a typical application of the novel remotely readable flow meter provided by the present invention;

FIGURE 2 is a sectional view of the flow meter unit taken substantially along line 2—2 of FIGURE 1;

FIGURE 4 is a perspective view of the remote register unit;

FIGURE 5 is a sectional view of the remote register unit taken substantially along line 5—5 of FIGURE 4;

FIGURE 6 is a schematic of the remote register operating circuit; and

FIGURE 7 is a schematic of an alternate remote register operating power supply.

Figure 3:
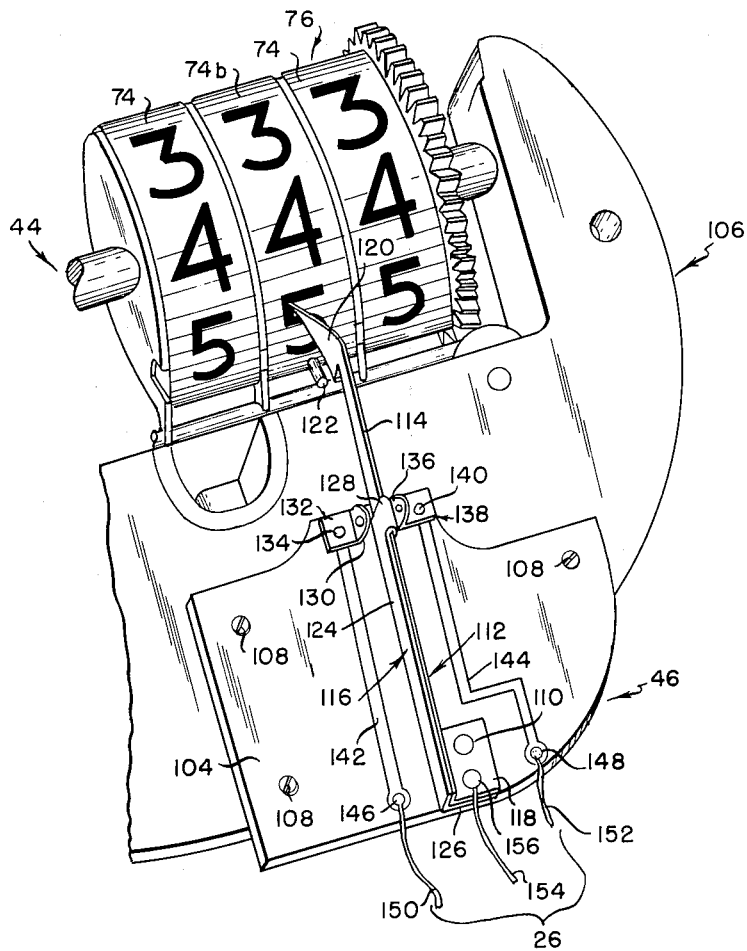
FIGURE 3 is a perspective view of a novel switching device utilized in the flow meter unit of the present invention looking toward the bottom of the sealed register of the flow meter unit.

Referring now to the drawing, FIGURE 1 illustrates a typical application of the novel remotely readable flow meter 20 provided by the present invention. Flow meter 20 includes a meter unit 22 located interiorly of a building 24 and connected by a multiconductor cable 26 to a remote register unit 28 mounted on the exterior of the building. Meter unit 22 measures and registers the volume of fluid flowing through it and, at a frequency proportional to the volume of flow, activates a meter advancing circuit arrangement to step an electromechanical register 30 in remote register unit 28 and provide a concurrent registration of the flow volume exteriorly of building 24.

Meter unit 22 (see FIGURE 2) is of the same general construction as the fluid flow meter described in detail in the R. Z. Hague et al. patent referred to above and includes a housing 32 divided by an integral wall portion 34 into a lower chamber 36 and an upper chamber 38. Lower chamber 36 houses an oscillating piston type fluid flow measuring device 40 and upper chamber 38 houses a sub-assembly comprising a permanently and hermetically sealed casing 42 within which are mounted a cumulative type register 44, preferably of the type disclosed in the above-mentioned R. Z. Hague et al. patent, and a remote register activating switching device 46. Register 44 is operated by the flow measuring device 40 and registers the cumulative volume of the fluid passed through meter unit 22. As register 44 advances, it periodically operates switching device 46, activating the remote register operating circuit arrangement to advance remote register 30.

The bottom access opening 48 of housing 32 is closed by a frangible frost plate 50 which has a corrosion resistant liner 52 and is maintained in fluid tight relationship to the housing by an annular bead 54 integral with liner 52 and a plurality of suitably spaced bolts 56 and washers 58.

The permanently and hermetically sealed casing 42 is fabricated from corrosion resistant material such as stainless steel and has an enlarged diameter upper end portion 60 which surrounds a transparent window 62. Window 62 is held in sealed relation to enlarged diameter casing portion 60 between gaskets 64 and 66. The top peripheral edge 68 of casing 42 is spun over gasket 66 after the sub-assembly is assembled to form a permanent seal which dirt and moisture cannot penetrate and which cannot be disassembled without destroying the casing. Thus, unauthorized persons are prevented from tampering with register 44 or switching device 46.

Secured to the top of register 44 by screws 70 is a dial plate 72 through which counter wheels 74 of the plural order, intermediate pinion type, carry-over mechanism equipped counter 76 of register 44 is visible. This arrangement enables the meter reader to read the meter through window 62 which is protected from damage by a metal cover 78 hingedly connected to meter housing 32 by a pivot pin 80. Cover 78 normally overlies and conceals register 44, but may be lifted to provide visual access to the register.

Water enters meter unit 22 through an inlet port 82 in housing 32, flows through a cylindrical screen 84 into lower chamber 36, enters measuring device 40 through an inlet port (not shown) in its top 86, and is exhausted from the measuring device through a radial outlet port (not shown) to an outlet port 88 in meter casing 32. Flow measuring device 40 is constructed in accordance with the principles set forth in the above-mentioned patent to R. Z. Hague et al. which may be referred to if further details of this device are deemed necessary for a complete understanding of the present invention.

Oscillation of the piston 90 in measuring device 40 by the fluid flowing therethrough, acting through a magnetic drive coupling 92, rotates a spindle 94 mounted in a coaxial tubular member 96 in the manner described in detail in the Hague et al. patent. Tubular member 96, which is closed at its bottom end by an integral wall 98, is sealed to casing 42 by an annular weld 100 or by brazing and is threaded into the meter housing to establish a firm connection between it and the housing. Spindle 94 is connected through gear reduction drive 102 (which may be of the type illustrated in the aforementioned patent to R. Z. Hague et al.) to counter 76 of register 44.

Referring now to FIGURE 3 of the drawing, and with continued reference to FIGURE 2, the novel remote reader activating switching device 46 includes a plate 104 of insulating material fixed to the bottom of flow meter unit register housing 106 as by screws 108. Fixed to the lower surface of plate 104 as by rivets 110 (only one of which is shown), is a contactor 112 which extends to a point adjacent the hundreds counter wheel 74b of flow meter unit sealed register 44.

Contactor 112 includes a contactor member 114 and a stiffener member 116. Contactor member 114 is an elongated strip of conductive metal having springlike qualities. Rivets 110 extend through a flange 118 formed at one end of member 114, fixing it to insulating plate 104. A triangular actuator portion 120, formed at the opposite end of contactor member 114, extends at a slight angle therefrom into the path of movement of an output member such as a pin 122 fixed to the hundreds counter wheel 74b of flow meter unit sealed register 44 between numerals 5 and 6.

Stiffening member 116 has a main body portion 124 which has substantially the same cross sectional configuration as and extends along contactor member 114. Rivets 110 extend through a normally extending flange 126 formed at one end of stiffener member 116, securing it to insulating plate 104. At the opposite end of stiffening member 116, an end portion 128 is bent over and contains contactor member 114. The motion of 114 is therefore transferred to member 116, causing actual contact closure through the latter. This eliminates the effect of any vibrations set up in member 114.

Contactor 112 is normally biased by its inherent springlike qualities against the depending portion 130 of a contact 132 fixed to the lower surface of insulating plate 104 as by a rivet 134, but may be moved by advancing movement of counter wheel mounted pin 122 from engagement with contact 132 into engagement with the depending portion 136 of a contact 138 fixed to the lower surface of insulating plate 104 adjacent contact 132 as by rivet 140. If the counter wheels are rotated backward as to reset register 44, pin 122 will not transfer contactor 112, but will merely force it tighter against contact 132 when it engages actuator portion 120. This permits register 44 to be reset without actuating remote register 30.

Contacts 132 and 138 are connected by leads 142 and 144 printed on the lower surface of insulating plate 104 to terminals 146 and 148 to which leads 150 and 152 are connected as by soldering. A third lead 154 is similarly connected to a terminal 156 formed at the end of switch contactor 112.

Turning now to FIGURE 2, leads 150, 152, and 154 together comprise conductor 26 which extends from the sealed sub-assembly in chamber 38 of fluid flow meter unit 22 between sub-assembly casing 42 and the periphery of window 62. A suitable sealing compound (not shown) is emplaced around cable 26 to preserve the hermetic seal in the sub-assembly.

From the sealed sub-assembly, cable 26 extends through an aperture 158 in meter casing 32 to the exterior of of building 24 and remote register unit 28.

Turning now to FIGURES 4 and 5, remote register unit 28 includes a housing 160 divided by an internal partition 162 into a sealed register compartment 164 and a preferably lockable battery compartment 166. Remote register unit 28 is mounted on the exterior of building 24 as by lag screws 168 which extend through apertures 170 in bosses 172 formed on housing 160. When unit 28 is mounted in place, the wall of building 24 seals its open inner end 174.

To permit access to battery compartment 166, an aperture 176 is formed in the bottom wall of remote register unit housing 160. Aperture 176 is closed by a closure member 178, one side of which is supported from remote register unit housing 160 by a projecting edge portion 180 of the closure member fitted into a correspondingly configured groove 182 formed adjacent the lower edge of meter housing 160. At its opposite edge, closure member 178 is detachably connected to remote register unit housing 160 by a key-operated lock 184 of suitable construction.

Housed in the sealed register compartment 164 of housing 160 are the plural order electromechanical register 30 (which is preferably the model CE40, 4.5 v., four digit mercury counter manufactured by General Controls Co.) and an energy storing device 188, which is preferably a 2000 microfarad, 15CWV computer grade electrolytic capacitor. The digits on the counter wheels 190 of remote register 30 are visible from the exterior of remote register unit 28 through a transparent window 192 fixed in an aperture 194 in the front wall 196 of remote register unit housing 160 by a window supporting frame 198.

Battery compartment 166 houses a register operating energy source such as a type TR–126 9 volt battery 200 which is supported by brackets 202 and 204 fixed to and depending from housing internal partition 162.

Referring now particularly to FIGURE 6, it will be remembered that, as fluid flows through flow meter unit 22, the counter wheels 74 of the register 44 sealed in casing 42 are advanced to provide an indication of the cumulative volume of fluid passing through the flow meter unit. Counter wheel 74b is, as was pointed out above, the hundreds wheel and, therefore, makes one rotation for every hundred gallons (or cubic feet or other flow unit) of fluid passed through the flow meter unit.

As the hundreds counter wheel 74b reaches the position where the numeral "0" formed on its edge is visible through dial plate 72 (see FIGURE 2), the pin 122 fixed to the counter wheel engages the actuator portion 120 of contactor 112, moving the contactor out of engagement with contact 132 and into engagement with contact 138. This completes a capacitor charging circuit from the positive terminal of battery 200 through lead 206, current limiting resistor 208 (which preferably has a resistance on the order of 27 ohms plus or minus 10% and a capacity of 0.5 watts), and lead 210 to capacitor 188 which is connected by lead 154, contactor 112, contact 138, and lead 152 to the negative terminal of battery 200.

The charging circuit just described is a novel and important feature of the present invention. The reason for this is as follows: Remotely readable fluid flow meters of the type to which the present invention relates are commonly idle for extended periods of time. For example, if the meter is a water consumption meter located in a house and the occupants are on vacation, no water will pass through the meter during the vacation period. During this entire period, contactor 112 may be biased into engagement with contact 138 by counter wheel mounted pin 122, maintaining the charging circuit. Even so, there will not be an abnormal drain on battery 200 since, when capacitor 188 is charged to its full capacity, there is no further flow of current in the charging circuit. This is a distinct improvement over the prior art devices in which, when the flow meter unit actuated switch was closed, the remote register operating battery was connected directly to the actuating solenoid or other electrical operator of the remote register and could drain through the solenoid coil until the battery was dead if the switch was not sooner opened.

After capacitor 188 is charged and fluid continues to flow through flow meter unit 22, the hundreds counter wheel 74b of meter unit register 44 rotates past the position where the numeral "0" is visible through dial plate 72 and the pin 122 fixed to the counter wheel rides off the end of switch contactor actuator portion 120, permitting the inherent resiliency of the contactor to bias it out of engagement with contact 138 and into engagement with contact 132. This completes a register actuating circuit from the positively charged side of capacitor 188 through leads 210 and 212 to the operating coil 214 of remote register 30 which is connected by lead 150, contact 132, contactor 112, and lead 154 to the negative side of the capacitor. The energy discharged from capacitor 188 through the above circuit energizes coil 214, advancing the appropriate counter wheel or wheels 190 in remote register 30. Since a remote register operating discharge of current is provided only once for every revolution of the hundreds counter wheel 74b in flow meter unit register 44, the lowest order counter wheel 190 in remote register 30 will read one order higher than counter wheel 74b; i.e., in thousands of gallons (or other flow unit).

While the capacitor discharging circuit is established the charging circuit in which battery 200 is interposed is open and there is no drain on the battery.

Interruption of the capacitor discharging circuit will induce in remote register operating coil 214 the voltage indicated by the plus and minus signs and a current which will tend to flow in the direction indicated by arrow 216. In order to prevent the induced current from flowing through lead 150 and causing arcing between contact 132 and contactor 112, a lead 218 is connected in parallel with remote register operating coil 214. A diode 220, interposed in parallel lead 218, permits the induced current to flow through parallel lead 218, but prevents flow through lead 218 of the current discharged from capacitor 188. The resistance of the diode 220 in lead 218 dissipates the induced current in the form of I²R losses. Interruptions which can cause such induced currents include contact bounce resulting from the release of contactor 112 from pin 122.

It will be apparent, from the foregoing description of the modus operandi of the present invention, that concurrent registrations of the volume of fluid passed through flow meter unit 22 are provided at flow meter unit 22 and at the remote register unit 28 exteriorly of building 24. Remote register 30 may be read from the exterior of building 24, eliminating the access problem discussed above. The sealed register 44 in flow meter unit 22 provides a check on remote register 30, making tampering with the latter readily detectable.

For example, remote register 30 may be rendered inoperative by shorting the leads in conductor 26. This, however, will produce a discrepancy between the readings of remote register 30 and sealed register 44, making it obvious that the remote register has been tampered with. Since the register 44 is sealed in casing 42 and access to the interior of the latter can be gained only be destroying it, attempts to tamper with both remote register 30 and sealed register 44 and avoid a discrepancy between their readings are precluded.

FIGURE 7 illustrates an alternating current power supply 222 which may be substituted for battery 200. Power supply 222 includes a transformer 224 with its primary winding 226 connected by leads 228 and 230 to a source of 117 volt alternating current (not shown) such as a tap from a circuit of the building in which the remotely readable fluid flow meter 20 is located. Transformer 224 is wound to provide a voltage in its secondary winding 232 on the order of 6.3 v. The current flowing in secondary winding 232 is rectified by a diode 234 connected to secondary winding 232 by a lead 236.

To substitute alternating current power supply 222 for battery 200, the end A of a lead 238 is connected to charging circuit lead 206 (see FIGURE 6) at the point indicated by reference character B. The end C of power supply lead 240 (which is connected to diode 234) is connected to lead 152 (see FIGURE 6) at the point indicated by reference character D. The operation of remotely readable flow meter 20, with power supply 222 substituted for battery 200, remains substantially unchanged.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A remotely readable flow meter, comprising: a flow measuring device having an output member moved through a closed path at a frequency proportional to the flow through said device; a readout unit remote from said flow measuring device including a register for indicating cumulative flow through said device; a single register operating source of electrical energy; and circuit means for transmitting register actuating pulses of energy to said register comprising a single capacitor having at least one terminal continuously connected between said register and said operating source, said capacitor being capable of storing register advancing quantities of energy; and means including switching means actuatable by said output member at a frequency proportional to the flow through said registering device for alternately connecting said capacitor to said energy source to charge said capacitor and to said register to thereby discharge said capacitor through and advance said register.

2. A remotely readable flow meter, comprising: a meter unit having a flow measuring device; a unit remote from said meter unit including a register and a register operating energy source; circuit means including switching means in said meter unit for transmitting register operating pulses of energy from said source to said register at a frequency proportional to the flow through said measuring device; and a register in said meter unit in a sealed casing to provide a check on the remotely disposed register, said sealed register comprising at least one counter wheel and said switching means including a switch having dual contacts, a fixedly mounted, flexible contactor biased against one of said contacts, means carried by said counter wheel for flexing and thereby moving said contactor into engagement with the other of said contacts, and means preventing the transmission of meter operating energy to said remote register when said sealed register is operated in reverse to reset it.

3. A remotely readable flow meter, comprising: a meter unit having a flow measuring device; a unit remote from said meter unit including a register and a register operating energy source; circuit means including switching means in said meter unit for transmitting register operating pulses of energy from said source to said register at a frequency proportional to the flow through said measuring device; and a register in said meter unit in a sealed casing to provide a check on the remotely disposed register, said sealed register comprising at least one counter wheel and said switching means including a switch having dual contacts, a fixedly mounted, flexible contactor biased against one of said contacts, and means carried by said counter wheel for flexing and thereby moving said contactor into engagement with the other of said contacts, said energy source comprising a direct current power supply and said circuit means including a capacitor connected to said power supply when said contactor is biased against said one contact and to said register when said contactor is moved to the other of said contacts, said remote register including a stepping coil and said circuit means further including a branch circuit including a diode connected in parallel with said coil, said diode being oriented to prevent passage of capacitor discharge current through said branch circuit and to conduct from said counter through said branch circuit current induced in said coil by the movement of said contactor from said one contact while said capacitor is discharging through said coil to prevent arcing between said contactor and said one contact.

4. The remotely readable flow meter as defined in claim 1, wherein said output member operated switching means comprises a plate, an elongated, flexible contactor fixed to said plate, a first contact on one side of and abutting said contactor, and a second contact on the opposite side of and spaced from said contactor.

5. The remotely readable flow meter as defined in claim 3, wherein said counter wheel carried means is a member protruding from said counter wheel and said contactor has an actuator portion engageable by and angularly disposed relative to said member.

6. A remotely readable flow meter, comprising: a flow measuring device having an output member moved through a closed path at a frequency proportional to the flow through said device; a readout unit remote from said flow measuring device including a register for indicating cumulative flow through said device; a register operating source of electrical energy; and circuit means for transmitting operating pulses of energy from said source to said register at a frequency proportional to the flow of the measured fluid through said measuring device, consisting of a switch having first and second contacts and a contactor, means operatively connected to said output member for effecting movement of said contactor between said first and second contacts, a first lead connected between said power source and said register, a second lead connected between said power source and said first contact, a third lead connected between said second contact and said register, and a fourth lead connected between said contactor and said first lead at a point between said power source and said register, said circuit means further including a single capacitor interposed in said fourth lead.

7. A remotely readable flow meter, comprising:
(a) a meter unit having a flow measuring device;
(b) a readout unit remote from said meter unit including a first register for indicating cumulative flow through said device, a single register operating energy source, circuit means including switching means in said meter unit for transmitting register operating pulses of energy from said source to said first cumulative flow register at a frequency proportion to the flow through said measuring device, and
(c) a second register for indicating cumulative flow through said device in said meter unit to provide a check on the remotely disposed first cumulative flow register, said meter unit having an output member adapted to be moved through a closed path at a frequency proportional to the flow through said measuring device, said switching means including a switch having dual contacts, a contactor, and means operatively connected to said output member for moving said contactor from one to the other of said contacts, said energy source comprising a direct current power supply, and said circuit means including a single capacitor connected to said power supply when said contactor is biased against said one contact and to said first cumulative flow register when said contactor is moved to the other of said contacts.

8. A remotely readable flow meter as defined in claim 7 wherein said output member is driven by a register member on said second cumulative flow register.

9. A remotely readable flow meter as defined in claim 7 wherein said switching means includes means preventing the transmission of meter operating energy to said first cumulative flow register when said second cumulative flow register is operated in reverse to reset it.

References Cited by the Examiner

UNITED STATES PATENTS

| 1,588,581 | 6/1926 | Ingram et al. | 340—203 |
| 2,301,262 | 11/1942 | Dixon | 73—274 |
| 2,473,542 | 6/1949 | Philpott | 324—70 |
| 2,671,211 | 3/1954 | Black et al. | |
| 2,908,778 | 10/1959 | Strandberg. | |
| 2,991,652 | 7/1961 | Bassett. | |
| 3,039,311 | 6/1962 | Bassett. | |

FOREIGN PATENTS 1,108,778   6/1961   Germany.

RICHARD C. QUEISSER, *Primary Examiner.*